(12) United States Patent
Smirnov et al.

(10) Patent No.: US 11,860,327 B2
(45) Date of Patent: Jan. 2, 2024

(54) COHERENT NOISE-BASED SEISMIC DATA VERTICALIZATION CORRECTION METHOD AND SYSTEM

(71) Applicant: SERCEL, Carquefou (FR)

(72) Inventors: Viktor Smirnov, Carquefou (FR); Clémence Berthonaud, Carquefou (FR); Julien Ribette, Carquefou (FR)

(73) Assignee: SERCEL, Carquefou (FR)

( * ) Notice: Subject to any disclaimer, the term of this patent is extended or adjusted under 35 U.S.C. 154(b) by 18 days.

(21) Appl. No.: 17/573,801

(22) Filed: Jan. 12, 2022

(65) Prior Publication Data

US 2023/0221454 A1  Jul. 13, 2023

(51) Int. Cl.
*G01V 1/28* (2006.01)
*G01V 1/38* (2006.01)
*G01V 1/18* (2006.01)

(52) U.S. Cl.
CPC ............ *G01V 1/3843* (2013.01); *G01V 1/186* (2013.01); *G01V 1/28* (2013.01); *G01V 2210/1423* (2013.01)

(58) Field of Classification Search
CPC ........ G01V 1/3843; G01V 1/186; G01V 1/28; G01V 2210/1423
See application file for complete search history.

(56) References Cited

U.S. PATENT DOCUMENTS

| 10,222,500 | B2 | 3/2019 | Leboeuf | |
|---|---|---|---|---|
| 10,620,332 | B2 | 4/2020 | Leboeuf | |
| 2008/0275649 | A1* | 11/2008 | Ozdemir | G01V 1/364 702/14 |
| 2015/0185349 | A1* | 7/2015 | Martinez | G01V 1/362 702/17 |
| 2019/0064379 | A1* | 2/2019 | Leboeuf | G01V 1/38 |

* cited by examiner

*Primary Examiner* — Isam A Alsomiri
*Assistant Examiner* — Abdallah Abulaban
(74) *Attorney, Agent, or Firm* — PATENT PORTFOLIO BUILDERS PLLC

(57) ABSTRACT

A method for verticalizing recorded seismic data, the method including recording first data with a particle motion sensor, wherein the particle motion sensor is located on a streamer, and the particle motion sensor is configured to be insensitive to a direct current, recording second data with a gravity motion sensor, wherein the gravity motion sensor is also located on the stream, and the gravity motion sensor is configured to be sensitive to the direct current and temporally synchronous to the particle motion sensor, selecting a cost function that associates corresponding values of the first data and the second data, determining a misalignment angle from maximizing the cost function, wherein the misalignment angle describes a misalignment between corresponding axes of the particle motion sensor and the gravity motion sensor, and correcting seismic data recorded by the particle motion sensor based on the misalignment angle so that the corrected seismic data is verticalized with regard to gravity.

20 Claims, 10 Drawing Sheets

COHERENT NOISE-BASED SEISMIC DATA VERTICALIZATION CORRECTION METHOD AND SYSTEM

BACKGROUND

Technical Field

Embodiments of the subject matter disclosed herein generally relate to methods and systems for verticalizing recorded seismic data and, more particularly, to mechanisms and techniques for estimating, based on a coherent noise, a misalignment angle of a particle motion sensor relative to a gravity sensing sensor, and correcting seismic data recorded by the particle motion sensor based on the misaligned angle.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural sensors 112, which are disposed along cables 114. A cable 114 together with its corresponding sensors 112 are sometimes referred to, by those skilled in the art, as a streamer 116. Vessel 110 may tow plural streamers 116 at the same time, as shown in the figure. The streamers may be disposed horizontally, i.e., lie at a constant depth relative to the ocean surface 118. Also, the plural streamers 116 may form a constant angle (i.e., the streamers may be slanted) with respect to the ocean surface or they may have a variable-depth profile (Broadseis technology from CGG). The totality of streamers and associated equipment (e.g., birds, deflectors, ropes) form a streamer spread.

Still with reference to FIG. 1, vessel 110 may also tow a seismic source array 120 configured to generate an acoustic wave 130. The acoustic wave 130 propagates downward and penetrates the seafloor 132, eventually being reflected by a reflecting structure 134. The reflected acoustic wave 136 propagates upward and is detected by the sensors 112.

The streamers are towed by the vessel 110 along a pre-plot path X. Each streamer includes plural streamer sections. As an example, FIG. 1 shows a streamer 116-K, where K can vary between 1 and 30, having many sections 116, connected to each other by a streamer connecting module 117. FIG. 1 labels, for simplicity, only two streamer sections $116_i$ and $116_{i+1}$ connected by module 117, where "i" can vary between 1 and 100. FIG. 1 also shows the streamer 116-K having a head 116A and a tail 116B.

During the seismic acquisition phase, the streamers 116 are maintained with a certain offset from each other along the cross-line direction Y by using a combination of ropes 140 and deflectors 142 located at the head of the streamers, as shown in FIG. 1. Also, for maintaining a certain depth of the streamer heads 116A, one or more head buoys 144 are connected to corresponding streamer heads. Similar buoys (not shown), called tail buoys, are connected to the tail end 116B of the streamers. In addition, streamer positioning devices 119 (only two shown in the figure for the streamer 116-K, but these devices are present on all the streamers and may be associated with each section $116_i$) are located along the streamer, for example, every 100 to 200 m, for maintaining a desired depth and cross-line position of the streamer. The streamer positioning devices 119, also known as birds, have wings that are controlled by a local controller and a global controller of the vessel so that the position of the streamer can be adjusted both on the cross-line direction and along a vertical axis.

One or more of the streamer sections may include different types of seismic sensors, for example, one or more pressure sensors and one or more particle motion sensors. This type of streamer section or streamer is called herein multi-sensor streamer. A pressure sensor may be a hydrophone while a particle motion sensor may be a geophone or an accelerometer or associated with a fiber optic technology, etc. A pressure sensor is designed to measure a change in the ambient pressure (usually within the water) produced by the reflected seismic wave 136 while a particle motion sensor is designed to sense a change in the motion of the particles of the ambient medium (usually water) due to the reflected seismic wave 136. The different types of sensors may be collocated within the streamer section.

A problem with the multi-sensor streamer is that while the pressure sensor is omnidirectional, i.e., it measures the same pressure irrespective of its orientation, the particle motion sensors measure is not. This means that the orientation of the particle motion sensor needs to be known in order to make sense of the measured speed or acceleration or displacement of the water particle. In other words, because the particle motion sensor measures an amplitude of a vector (displacement, velocity or acceleration), the angle between (1) the particle motion sensor's sensing axis (its orientation) and (2) the measured vector needs to be known.

Although during the manufacturing process of the streamer, the particle motion sensors are intended to have their sensing axis aligned with the gravity, when towed in water, the streamer rotates so that the asserted orientation of the particle motion sensor with the gravity is illusory during the seismic survey. There are two known solutions to determine the orientation of the particle motion sensor used today.

A first solution consists in mechanically insuring that the particle motion sensor is in a known orientation, using for example, the gravity. One way to perform this is to ballast the particle motion sensor and to mount the particle motion sensor on a gimbal system in a housing filled with a lubricant damping fluid.

This first solution has the main disadvantage of affecting the particle motion sensor response, as the motion of the sensor induced by the streamer's rotation is biased by the gimbal arrangement (inertia, friction, etc.). Moreover, such gimbal mounting is usually complex, because it involves additional mechanical parts, and takes too much space inside the streamer.

A second solution is to create a 2 or 3-dimension particle motion sensor and to use a nearly collocated tilt sensor, with a known orientation, compared to the particle motion sensor. The tilt measurement is then used to recover the vertical, the cross-line, or the inline component of the particle motion wave. This solution can, for example, be implemented through a MEMS ("micro-electro-mechanical system") device that can measure at the same time the tilt and the acceleration.

However, since the relative angle of the tilt sensor compared to particle motion sensor needs to be known precisely, it requires a calibration procedure during the manufacturing process which might be costly. Moreover, the angle between the tilt sensor's axis and the sensing axis of the particle motion sensor should remain constant, although a small variation could be considered as being negligible. Since an angular bias created by mechanical stresses or aging of the streamers can appear during the lifetime of the streamer and lower the performances of the sensor (also known as vector fidelity) if too high, it might be indicated to periodically calibrate the streamer, which is expensive and undesirable.

Thus, there is a need to have a method that provides the particle motion sensor's orientation during the seismic survey without using expensive particle motion sensors or ineffective factory calibrations. Accordingly, it would be desirable to provide systems and methods with such capabilities.

SUMMARY

According to an embodiment, there is a method for verticalizing recorded seismic data, and the method includes recording first data with a particle motion sensor, wherein the particle motion sensor is located on a streamer, and the particle motion sensor is configured to be insensitive to a direct current; recording second data with a gravity motion sensor, wherein the gravity motion sensor is also located on the streamer, and the gravity motion sensor is configured to be sensitive to the direct current and temporally synchronous to the particle motion sensor; selecting a cost function that associates corresponding values of the first data and the second data; determining a misalignment angle from maximizing the cost function, wherein the misalignment angle describes a misalignment between corresponding axes of the particle motion sensor and the gravity motion sensor; and correcting seismic data recorded by the particle motion sensor based on the misalignment angle so that the corrected seismic data is verticalized with regard to gravity.

According to another embodiment, there is a computing device configured to verticalize recorded seismic data, and the computing device includes an interface configured to, receive first data, which is recorded with a particle motion sensor, wherein the particle motion sensor is located on a streamer, and the particle motion sensor is configured to be insensitive to a direct current. The interface further receives second data, which is recorded with a gravity motion sensor, wherein the gravity motion sensor is also located on the streamer, and the gravity motion sensor is configured to be sensitive to the direct current. The computing device further includes a processor connected to the interface. The computing device is configured to selects a cost function that associates corresponding values of the first data and the second data, determine a misalignment angle from maximizing the cost function, wherein the misalignment angle describes a misalignment between corresponding axes of the particle motion sensor and the gravity motion sensor, and correct seismic data recorded by the particle motion sensor based on the misalignment angle so that the corrected seismic data is verticalized with regard to gravity.

According to yet another embodiment, there is a non-transitory computer readable medium including computer executable instructions, wherein the instructions, when executed by a processor, implement the method noted above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2A illustrates the expected orientation of a particle motion sensor in a streamer relative to the gravity while

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a streamer having two different types of particle motion sensors. However, the embodiments to be discussed next are not limited to these particle motion sensors. The principles of this invention may be applied to other types of streamers, for example, those that include additional sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Prior to discussing the novel solution for addressing the above-noted problems of the streamers having particle motion sensors, a brief discussion concerning the various causes that produce a tilt in a streamer is now presented.

Figure 1:
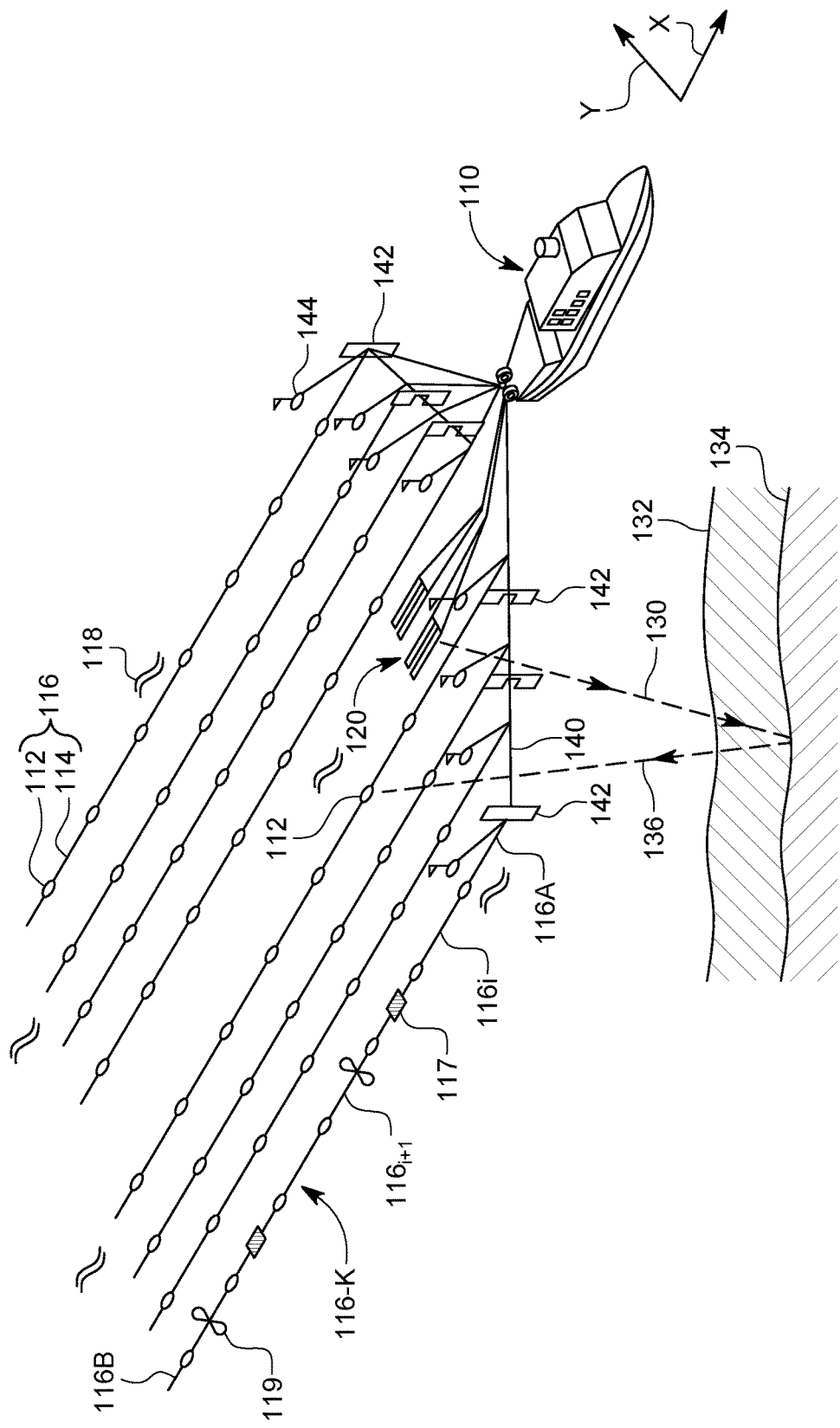
FIG. 1 is a schematic diagram of a conventional seismic data acquisition system having plural horizontal streamers.
Figure 2A:
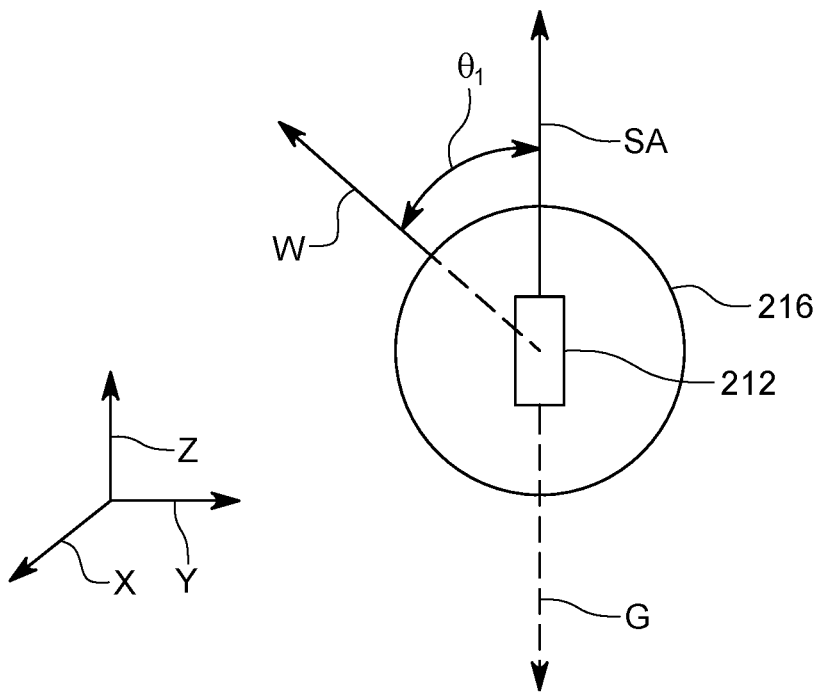
Figure 2B:
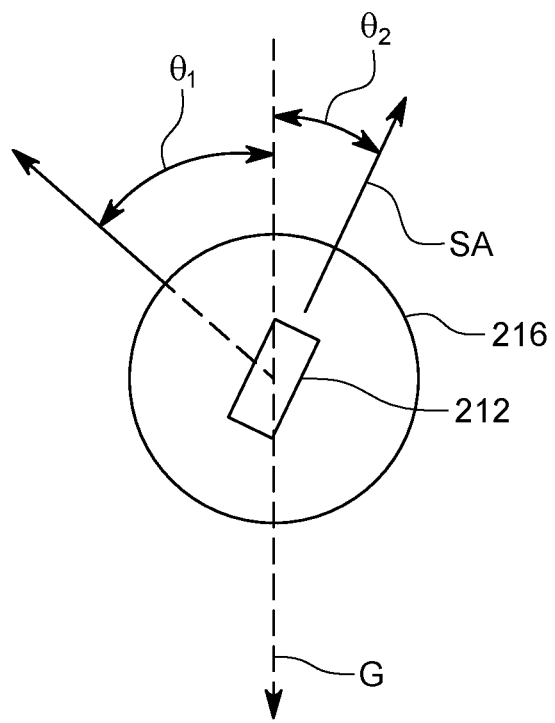
FIG. 2B illustrates the actual orientation of the particle motion sensor, which is misaligned with the expected orientation.

The seismic streamers are subject to several modes of vibration due to the action of ocean surface waves, tugging, external devices, current, etc. These vibrations are responsive for making the streamer, more precisely, various portions of the streamers, to move relative to each other so that the particle motion sensors located in these portions have their sensing axes pointing in various directions at the same instant. Unlike hydrophones that are by design insensitive to vibrations, a multi-sensor streamer comprises particle motion sensors that will pick up these vibration as noise. In other words, as illustrated in FIGS. 2A and 2B, a streamer 216 (a cross-section is shown in the figures) is shown having a particle motion sensor 212 located inside the streamer. A sensing axis SA of the particle motion sensor 212 is assumed, during the seismic survey, to be aligned (with a negative sign) with the gravity G as shown in FIG. 2A. Thus, a water particle movement along direction W, which is tilted with an angle $\theta_1$ relative to the sensing axis SA, when recorded with the particle motion sensor 212, can be correctly identified along the desired axes X, Y and Z. Axes X, Y, Z define an inertial system of reference, i.e., a system attached to the earth and supposed to be fixed during the entire seismic acquisition process. However, due to the various vibrations discussed above, the streamer 216 turns and moves up and down and left and right so that the actual sensing axis SA of the particle motion sensor 212 makes an angle $\theta_2$ with the gravity G and this angle changes in time. By not being aware of angle $\theta_2$, the components of the particle motion or speed or acceleration along the desired axes X, Y and Z cannot be accurately determined.

To be able to calculate this angle $\theta_2$, the various vibration modes in a seismic streamer need to be understood and estimated. The most important vibration modes for a streamer are:
1. Longitudinal vibrations,
2. Transverse vibrations, and
3. Angular vibrations.

The longitudinal vibrations (i.e., along the streamer) are not sensed for the vertical and crossline axes of the particle motion sensors because this motion is perpendicular to their sensing axis. Note that a 3-dimensional (3D) particle motion sensor has in fact one sensor for each direction, i.e., one sensor sensing along the X direction, which is assumed to coincide with the longitudinal axis of the streamer, one sensor sensing along the Y direction, which is assumed to be a line perpendicular to all the streamers, i.e., the cross-line direction, and one sensor sensing along the Z direction, which is assumed to be aligned with the gravity. Thus, the longitudinal vibrations, which are along axis X, are not impacting the particle motion sensing capabilities of the sensors along the Y and Z axes.

Figure 2C:
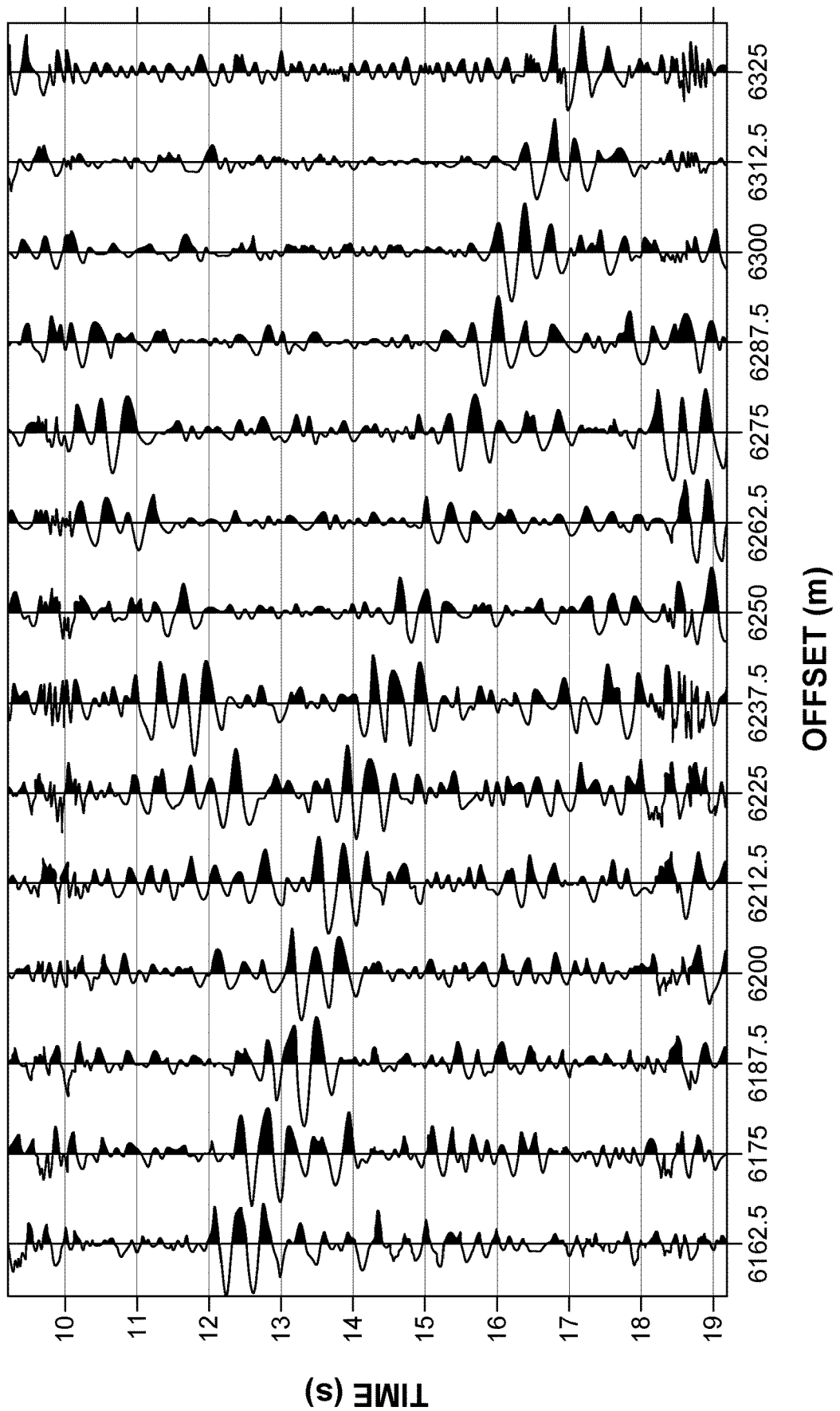
FIG. 2C illustrates coherent noise recorded by the particle motion sensor and the coherent noise corresponds to transverse vibrations that propagate along the streamer.

The transverse vibrations (in the YZ plane) will have large amplitudes in the low frequencies range, i.e., 1 Hz to about 30 Hz. The transverse vibrations in a streamer are generally generated by the birds 119 and these vibrations propagate transversely to the inline axis X, along the streamer. These transverse vibrations are considered to be coherent noise as they propagate along the inline axis of the streamer and are recorded by several sensors, as illustrated in FIG. 2C. This coherent noise is typically filtered out by the seismic survey operator as it does not carry any relevant seismic information.

The angular vibrations (rotations of the streamer about its longitudinal axis X) could be sensed by the particle sensors if they are offset from the center of the streamer. The rotation of the streamer occurs mainly below 1 Hz.

In general, the transverse vibration is the strongest noise mode.

Figure 3:
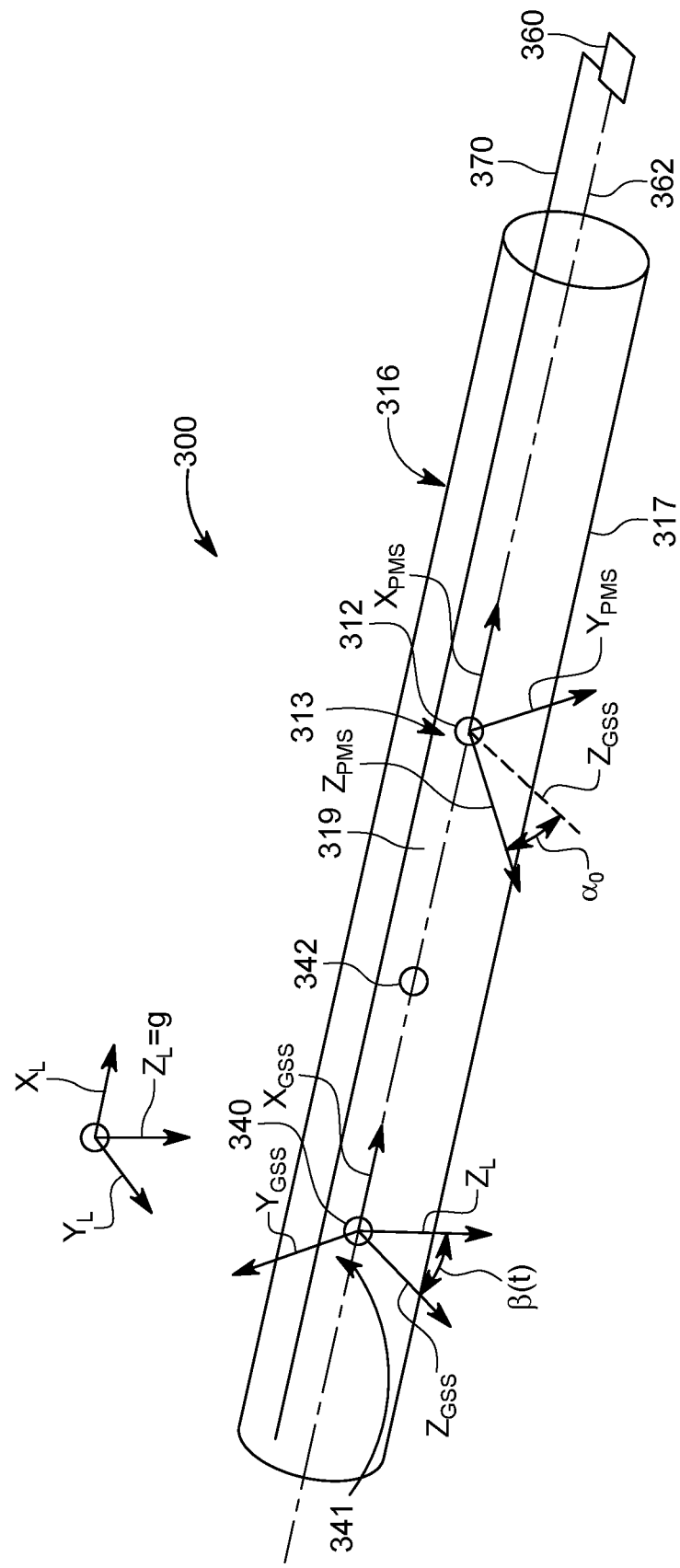
FIG. 3 is a schematic illustration of a streamer having a gravity sensing sensor and a particle motion sensor and their relative orientations relative to the gravity.

According to an embodiment illustrated in FIG. 3, a 2 or 3-axis gravity sensing sensor 340 (e.g., accelerometer with a DC-response capability, like a MEMS accelerometer) is integrated in the streamer 316 so that, with adequate sampling rate, it will sense:
1) the variation of the projection of the gravity due to the rotation of the streamer; and
2) the transverse acceleration corresponding to the transverse vibrations of the streamer.

FIG. 3 shows a system 300 that includes a streamer 316, gravity sensing sensor 340, particle motion sensor 312, and an optional hydrophone 342. Note that some streamers assembly the information from a group of particle motion sensors into a single data point. Thus, the term "particle motion sensor" is understood in the following to mean a single sensor that generates an output that is used for seismic data imaging, or a group of seismic sensors whose output are averaged and a single averaged output is used for seismic data imaging. System 300 may also include a controller 360 that is connected through a communication link 362 to the gravity sensing sensor 340 and particle motion sensor 312. Controller 360 may be located on the streamer, inside the streamer, on the towing vessel, or distributed between the streamer and the towing vessel. Other type of sensors may be used in addition to the particle motion sensor and/or hydrophone, for example, an optical fiber 370. FIG. 3 also shows streamer 316 having a skin 317 that prevents the ambient water to enter an inside 319 of the streamer. The sensors noted above are located within the inside 319 and they are connected to the communication link 362.

The gravity sensing sensor 340 is chosen so that it can sense the gravity acceleration with a good signal-to-noise (S/N) ratio. Note that the traditional particle motion sensors (accelerometers or geophones) are by design made so that they are not affected by the gravity, i.e., they do not measure the gravity. In this regard, although the gravity sensing sensor may be an accelerometer and the particle motion sensor may also be an accelerometer, these accelerometers are different from each other. In other words, the particle motion sensor 312 is manufactured to not be sensible to a direct current (DC), which prevents this sensor from recording the gravity and estimating the roll of the streamer. However, the gravity sensing sensor 340 is sensitive to the DC and can determine the orientation of the gravity. From this point of view, the two sensors 312 and 340 are different.

With this sensor configuration, as discussed later, the measured data 341 from the gravity sensing sensor 340 and the measured data 313 from the particle motion sensor 312 can be used to determine the angular position of the particle motion sensor relative to the gravity sensing sensor, for example, with appropriate techniques that are discussed later.

The angular position of the particle motion sensor 312 relative to the gravity sensing sensor 340 determined as discussed later may take place in the controller 360, which is located next to the sensors, or on the towing vessel, on the streamer, or distributed on the vessel and the streamer. Note that the gravity sensing sensor 340 does not have to be a MEMs sensor. Any sensor that is capable of either directly determining the orientation of the gravity or in combination with a processing algorithm, determining the orientation of the gravity, may be used. In this regard, it is noted that [1] and [2] disclose such systems and methods that use one or more geophones or other sensors for determining the orientation of the gravity. The embodiments discussed herein are using the MEMs for simplicity but the principles discussed in these embodiments equally apply to other sensors that by themselves or in combination with a processing technique are capable of determining the orientation of the gravity.

Figure 4:
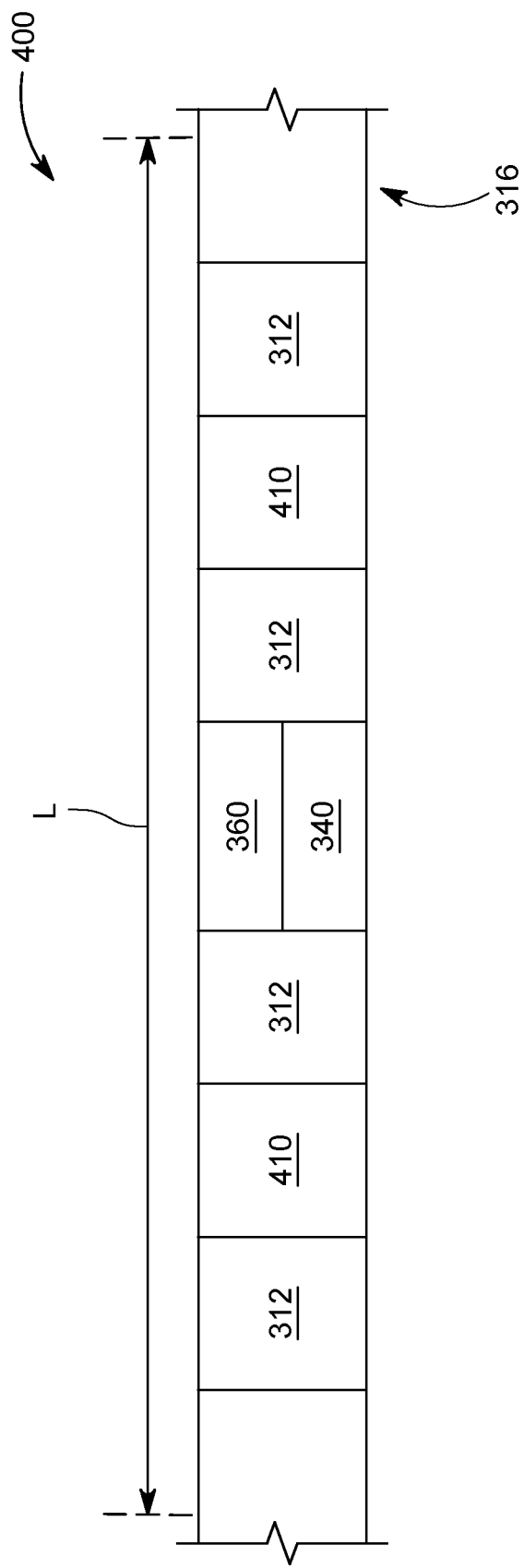
FIG. 4 is a schematic illustration of a single reception point group that includes a gravity sensing sensor and plural particle motion sensors.
Figure 5:
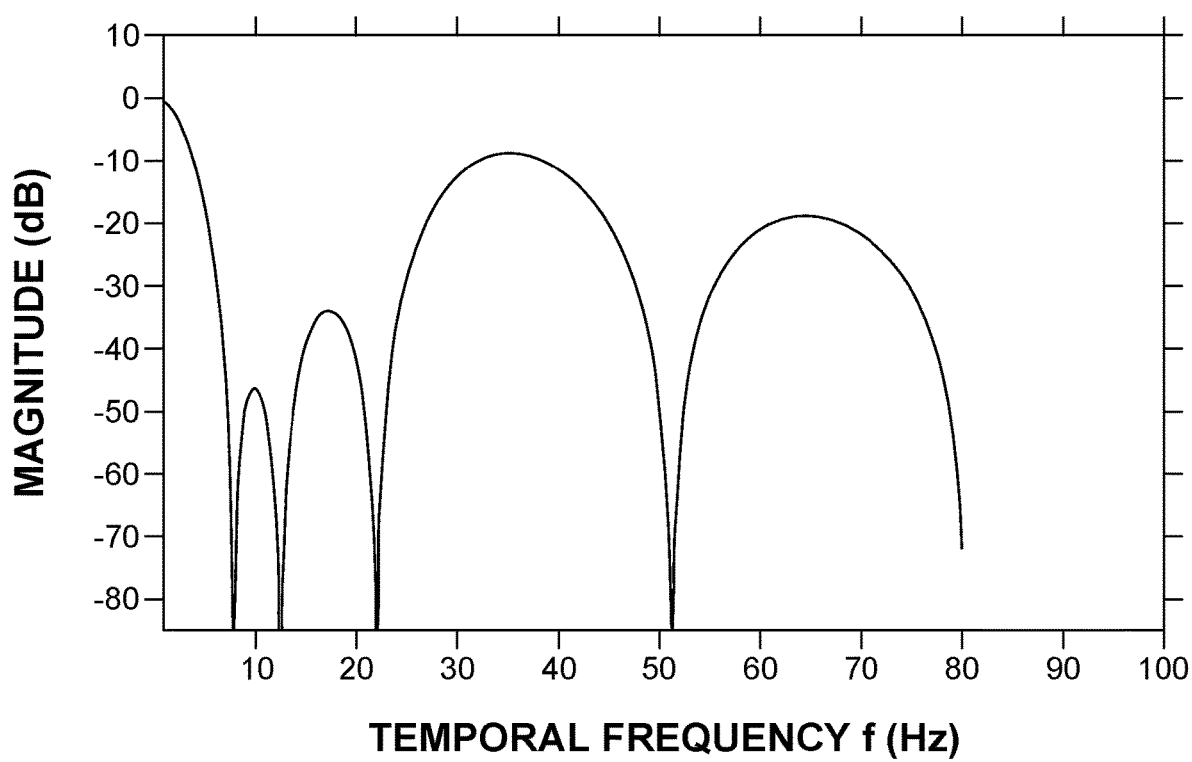
FIG. 5 illustrates the spatial filtering of the plural particle motion sensors for a single reception point group, in the temporal domain.

The streamer 316 shown in FIG. 3 is considered to include plural gravity sensing sensors 340, plural particle motion sensors 312, and also plural hydrophones (not shown) for measuring a change in pressure of the ambient water. These sensors are grouped, as illustrated in FIG. 4, within corresponding reception point groups 400, and plural reception point groups 400 are distributed along each streamer. FIG. 4 shows that a single reception point group 400, which may have a length of about 12.5 m, includes at least one controller 360, one gravity sensing sensor 340, plural particle motion sensors 312 located (in one embodiment they may be centered) around the controller 360, and plural hydrophones 410 also located (in one embodiment they may be centered) around the controller 360, and optionally, one or more tilt sensors. The signals from the plural hydrophones 410 are summed (spatial filtering) to reduce the impact of different coherent noises (e.g., bulge waves, torsional waves, etc.) on the seismic data. The signals from the particle motion sensors 312 may also be summed together for achieving spatial filtering, to reduce the impact of the different coherent noises on the seismic data. Thus, in one embodiment, the signals from the plural particle motion sensors of a single reception point group 400 are combined as a single signal. The controller 360 is configured to digitize the data from the group of the particle motion sensors 312 and the data from the group of the hydrophones 410 for a given single reception point group 400. In this embodiment, the controller 360 may also include the gravity sensing sensor 340, which is used to calculate the roll of the streamer relative to the gravity. By arranging the particle motion sensors 312 into groups, and averaging the recorded seismic data registered to cut out the coherent noise propagating at a specific velocity, there is a spatial filtering of the data. This filtering of the particle motion sensors 312 is illustrated in FIG. 5.

Figure 6:
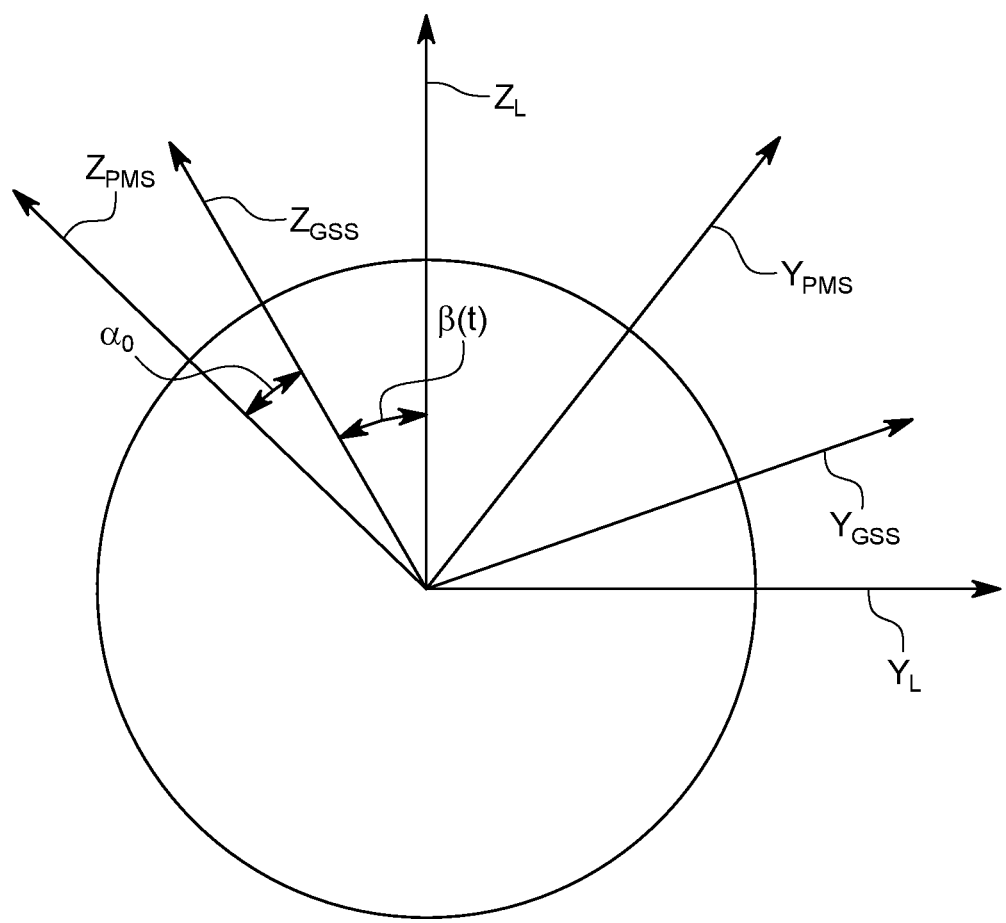
FIG. 6 illustrates the misalignment of the axes of the gravity sensing sensor and the particle motion sensor in a given reception point group.

As previously discussed, to ensure the quality of the seismic data recorded with the particle motion sensors 312, this data needs to be verticalized, i.e., oriented according to the gravity vector. To better understand the problem that is solved by this embodiment, FIG. 6 illustrates the land coordinate system described by axes $Y_L$ and $Z_L$. These axes are fixed relative to the Earth, which means that their orientation does not change no matter how the streamer rolls or moves in the water. FIG. 3 shows the earth-referenced orthonormal coordinate system $(X_L, Y_L, Z_L)$ with axis $Z_L$ pointing downwards, collinear with the gravity vector G, and the axis $X_L$ oriented along the streamer. The seismic data recorded by each particle motion sensor 312 needs to be expressed in this common (or global) coordinate system so that the processing of the acquired seismic data can be performed. In the following, the streamer 316 is considered to be flat and collinear with the $X_L$ direction, which is also the longitudinal axis of the streamer.

The gravity sensing sensor (GSS) 340 has its own system of orthogonal coordinates $(X_{GSS}, Y_{GSS}, Z_{GSS})$, where axis $X_{GSS}$ is selected (when the gravity sensing sensor is attached to the streamer) to be collinear with the longitudinal axis of the streamer (and with axis $X_L$). The gravity sensing sensor provides the accelerations for at least $Y_{GSS}$ and $Z_{GSS}$ directions, respectively $AccY_{GSS}(t)$ and $AccZ_{GSS}(t)$. FIGS. 3 and 6 show an angle $\beta(t)$ being the angle formed by axis $Z_{GSS}$ with $Z_L$, i.e., between the true gravity and the Z axis of the gravity sensing sensor. The angle $\beta(t)$ can be measured by the gravity sensing sensor 340 as the gravity sensing sensor 340 is sensible to the DC current. Note that if a parameter is represented in this document as being followed by the symbol "t," it means that this parameter varies in time. This means that the angle $\beta(t)$ varies in time as the streamer rolls in the water, relative to the gravity direction G, due to the torsional movement, which is due to the superposition of many phenomena, one of which is the mechanical tension.

The particle motion sensor (PMS) 312 has its own system of orthogonal coordinates $(X_{PMS}, Y_{PMS}, Z_{PMS})$, where axis $X_{PMS}$ is selected (when the particle motion sensor is attached to the streamer) to be collinear with the longitudinal axis of the streamer (and thus, with axes $X_L$ and $X_{GSS}$). The particle motion sensor records the seismic data for Y and Z directions, i.e., PMSY(t) and PMSZ(t), respectively. Quantities PMSY and PMSZ can be displacements or velocities or accelerations.

FIG. 6 shows that the Y and Z axes of the particle motion sensor 312 are rotated relative to the true gravity and also relative to the corresponding axes of the gravity sensing sensor 340. Indeed, during the manufacturing process, no matter how much care is exerted to place the gravity sensing sensor and the particle motion sensors to have their axes perfectly aligned with each other, a misalignment between these axes might occur: a single section of a streamer, which is manufactured as a single unit, has a length of 150 to 200 m, and tens of particle motion sensor and gravity sensing sensors to handle the natural tendency of bending and experiencing torsional movements. Thus, according to this embodiment, instead of trying hard to align the plural sensors inside each section of the streamer during the manufacturing process, a misalignment is allowed to exist between the plural particle motion sensors that form a reception point group 400, relative to the gravity sensing sensor 340 of that specific reception point group, and the misalignment angle $\alpha_0$, which is shown in FIGS. 3 and 6, is calculated as discussed next. In other words, the manufacturing process of a streamer according to this embodiment is relaxed so that alignment between the gravity sensing sensor and the particle motion sensor is not strictly enforced. For each reception point group 400, the particle motion sensors 312 are also misaligned and thus, the misalignment angle $\alpha_0$ is calculated for each reception point group to be the average value of the misalignment angle of each particle motion sensor in that group. This means that each reception point group 400 may have a different misalignment angle $\alpha_0$ but all the particle motion sensors within a same reception point group are associated with a same misalignment angle relative to the gravity sensing sensor 340. This is easier to achieve in practice as the length of the reception point group 400 is about 12.5 m or shorter.

A method for determining the actual orientation of the particle motion sensor 312 relative to the gravity sensing sensor 340 based on a coherent noise is now discussed with regard to the figures. This method not only has the advantage of simplifying the manufacturing process, reducing the manufacturing time and reducing the cost of the streamer, but also has the capability to recalibrate the misalignment between these sensors in the field, as often as necessary. This is advantageous over the existing streamers because there are situations, for example, during a seismic campaign, when some events such as a fishing net catch, can result in modifying this angle, which requires a recalibration step in the factory, which is long and costly.

According to this novel method, the goal is to maximize a scalar product between the acceleration sensed by the gravity sensing sensor 340 and the acceleration sensed by the particle motion sensor 312 for the same coherent noise that propagates through the streamer. This method uses a direct estimation of the misalignment angle $\alpha_0$, which is faster and has a better resolution than the methods disclosed in [1] and [2]. In this regard, note that [1] uses values provided by the hydrophones for correcting the orientation of the particle motion sensors while [2] uses a spectral coherence between the sensors from which a calibration angle is iteratively determined, which is an indirect method.

According to this novel method, the readings of the particle motion sensors 312 are properly verticalized relative to the reading of the gravity sensing sensor 340 when the scalar product between the vectorial signals (readings) sensed by both sensors is maximum. In this regard, consider that the particle motion sensor 312 measures, along the axes $Y_{PMS}$ and $Z_{PMS}$ in FIG. 6, vectors A and B, respectively, and the gravity sensing sensor 340 measures along the axes $Y_{GSS}$ and $Z_{GSS}$, vectors $Y_\theta$ and $Z_\theta$, respectively, where angle θ describes the calculated misalignment between the readings of the gravity sensing sensor and the particle motion sensors at various instances. Note that each of the vectors A, B, $Y_\theta$ and $Z_\theta$ includes plural measurements taken at different times, for example, each second or each millisecond, etc. Note also that the data from these sensors are time synchronous.

A cost function J is introduced that has the angle θ as its variable, and the cost function J describes the scalar product between the readings of the two sensors as follows:

$$J(\theta) = Y_\theta A^T + Z_\theta B^T, \quad (1)$$

where T represents the transpose of the vector, and the output of the cost function J is a scalar. The $Y_\theta$ and $Z_\theta$ vectors are rotated relative to the A and B vectors by the angle θ. Each of the A, B, $Y_\theta$ and $Z_\theta$ vectors has the same number of components, and the number of components can vary from tens to hundreds of thousands of readings. The number of the components of each vector is not limited. Depending on the recording time, the number of components is smaller of larger. For example, the recording time may be from seconds to days, with the measurements/readings of the vectors being taken every second or ever millisecond or any other desired time interval. Note also that the data from these sensors are time synchronous.

By maximizing the cost function given by equation (1), the following misalignment angle is obtained:

$$\theta_{misalignment} = \arctan\left(\frac{AZ_\theta^T - Y_\theta B^T}{Y_\theta A^T + Z_\theta B^T}\right). \quad (2)$$

The resultant $\theta_{misalignment}$ is in fact the misalignment angle $\alpha_0$. This approach can be applied as the sensor readings are in the temporal domain, i.e., all the components of the vectors A, B, $Y_\theta$ and $Z_\theta$ are in the temporal domain.

The coherent noise that is used to generate the components that form the A, B, $Y_\theta$ and $Z_\theta$ readings may come from various sources. According to one implementation, the transverse vibrations that are generated in the streamer 316 due to the motion of the birds 119 constitute the coherent noise. For this case, the recordings of the gravity sensing sensor 340 and the particle motion sensors 312 are associated with the up and down motion of the streamer due to the presence of the birds. Thus, no seismic signal is used for this embodiment, i.e., the seismic source 120 does not need to be activated to record the values of the A, B, $Y_\theta$ and $Z_\theta$ vectors. However, to be able to generate these transverse vibrations in the streamer, it is necessary for the streamer to be deployed in water and to move along the inline direction, so that the birds 119 actually interact with the water and move in various ways. These movements of the birds are substantially coherent as they are generated as a result of the interaction of the wings of the birds with the water and the tension between the birds and the corresponding streamer sections. In a different embodiment, the seismic source 120 or an additional source may be used to generate the coherent noise to be recorded by the sensors 312 and 340.

Figure 7:
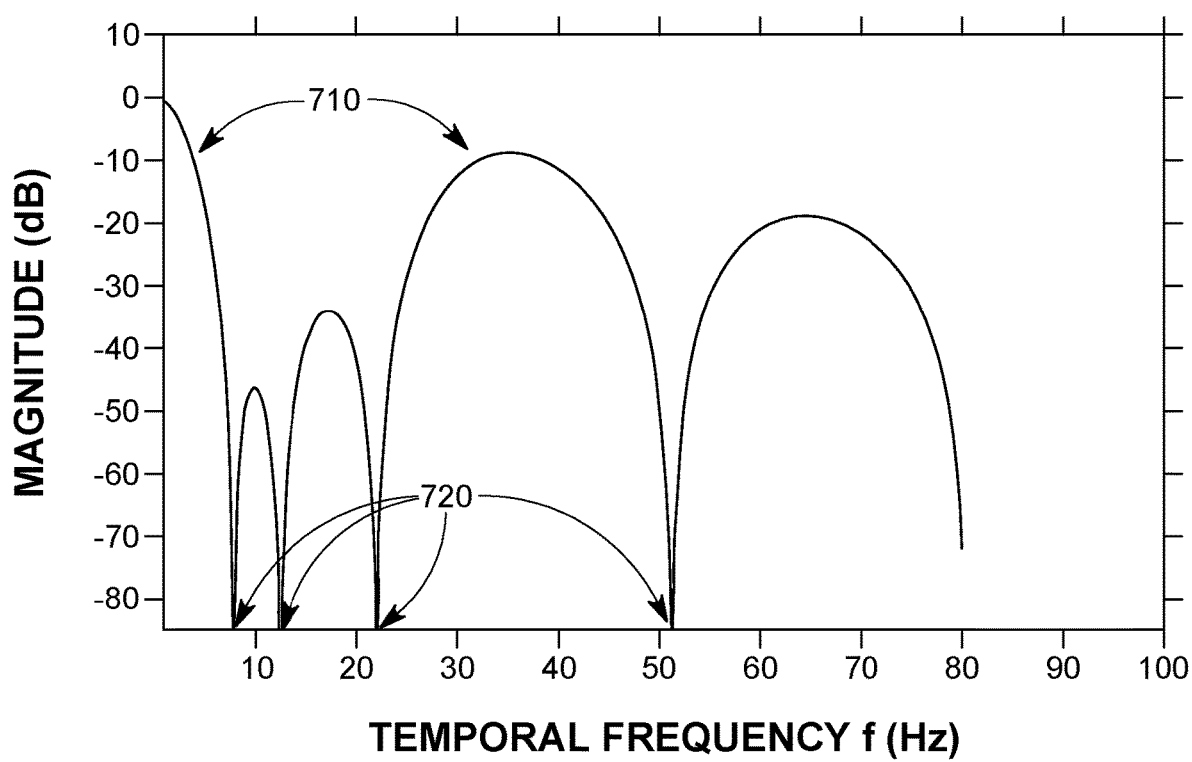
FIG. 7 illustrates the spatial filtering of the plural particle motion sensors for a single reception point group, in the frequency domain.

The method discussed above may also be applied in the frequency domain. Moreover, by selecting some frequencies where the particle motion sensors' accelerations are not attenuated, it is possible to estimate the misalignment angle on these data. FIG. 7 shows frequencies 710 that are not attenuated and frequencies 720 that are attenuated. The frequencies 710 can be used, in an equation similar to equation (1), to set up a cost function J and calculate the misalignment angle $\alpha_0$ between the readings on the Y and Z axes of the particle motion sensors 312 and the gravity sensing sensor 340. Other scores can be used from the same data (the general idea is always to find the angle that allows the MEMS data after rotation to be as similar as possible to the SFA data). For example, one can use the difference between these components:

$$J(\theta) = \|Y_\theta - A\|^2 + \|Z_\theta - B\|^2, \quad (3)$$

where $\|x\|^2$ designates the L2 norm. In this regard, it is noted that when the new score of equation (3) is used to find the angle that minimizes the difference it is found the same angle as with the scalar product, i.e., $$\theta_{misalignment} = \arctan\left(\frac{AZ_\theta^T - Y_\theta B^T}{Y_\theta A^T + Z_\theta B^T}\right).$$

The methods discussed above overcome the drawbacks of the traditional systems noted in the Background section, by measuring the relative position of the gravity sensing sensor versus the particle motion sensors for each reception point group 400, calculating the angle difference between their Z axes using a cost function, and rotating the recorded raw seismic data with the calculated angle difference to verticalize the measured data.

Thus, this technique does not require a precise calibration procedure for the sensors during the manufacturing process or prior to conducting the seismic survey, as the traditional surveys do. In other words, because the angle between the sensing axes of the gravity sensing sensor and the particle motion sensors for each reception point group are estimated continuously, the vector fidelity of the particle motion sensor is optimized and the streamer does not need to be calibrated periodically.

Figure 8:
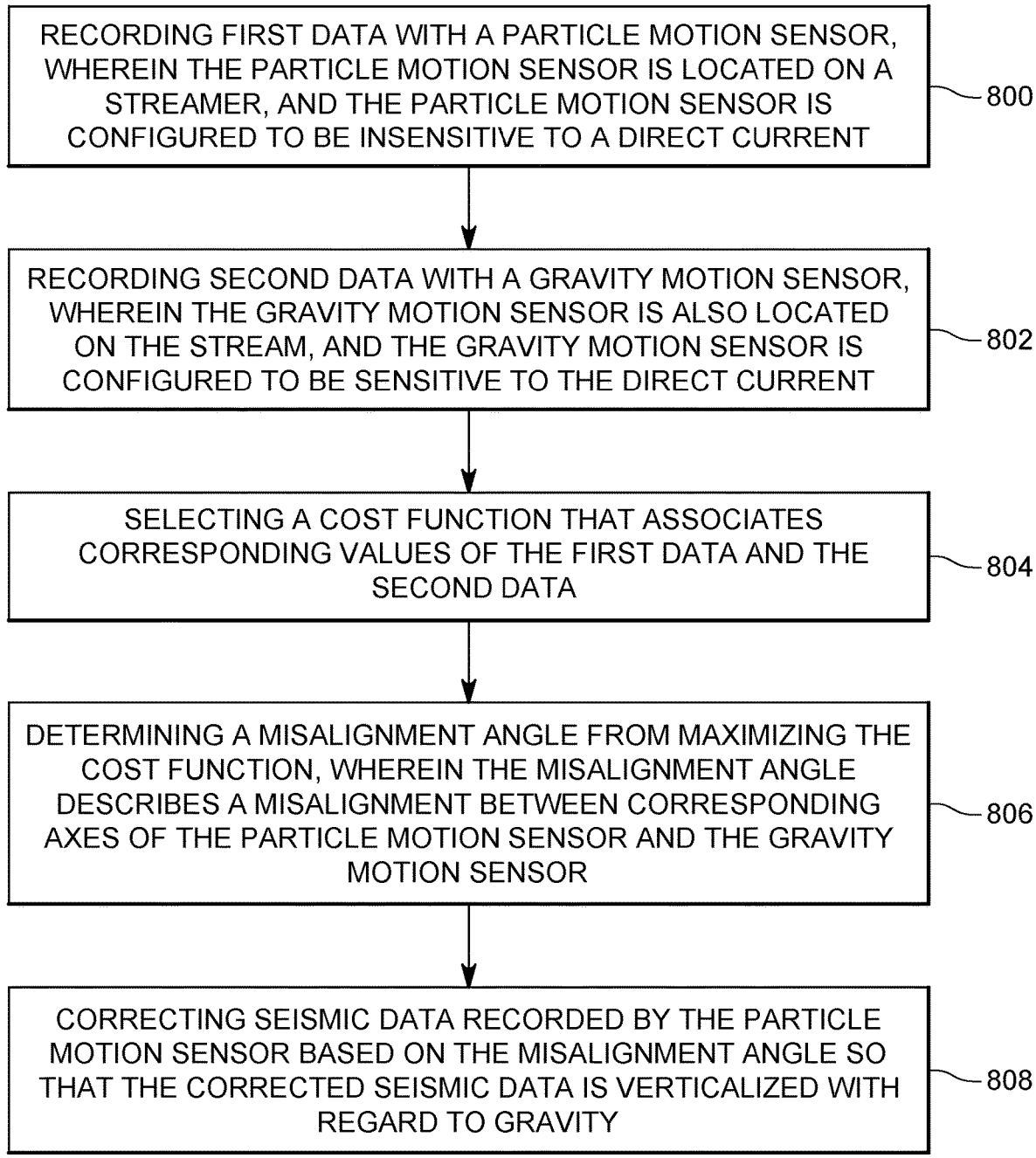
FIG. 8 is a flow chart of a method for calculating the misalignment angle between the gravity sensing sensor and the particle motion sensor for a given single reception point group.

A method for verticalizing recorded seismic data based on one or more of the embodiments discussed herein is now discussed with regard to FIG. 8. The method includes a step 800 of recording first data 313 with a particle motion sensor, wherein the particle motion sensor is located on a streamer, and the particle motion sensor is configured to be insensitive to a direct current, a step 802 of recording second data 341 with a gravity motion sensor, wherein the gravity motion sensor is also located on the stream, and the gravity motion sensor is configured to be sensitive to the direct current and temporally synchronous to the particle motion sensor, a step 804 of selecting a cost function that associates corresponding values of the first data and the second data (for example, a scalar product), a step 806 of determining a misalignment angle from maximizing the cost function, wherein the misalignment angle describes a misalignment between corresponding axes of the particle motion sensor and the gravity motion sensor, and a step 808 of correcting seismic data recorded by the particle motion sensor based on the misalignment angle so that the corrected seismic data is verticalized with regard to gravity.

In one application, the first data and the second data are recorded in response to a coherent noise present in the streamer. The coherent noise corresponds to transverse vibrations exerted on the streamer by one or more positioning devices attached to the streamer. The method may further include a step of calculating an orientation of the gravity based on measurements of the gravity sensing sensor. The cost function is defined as a scalar product between a first vector built based on the first data and a second vector built based on the second data. The method may also include a step of rotating the seismic data with the calculated misalignment angle so that the corrected seismic data is aligned with the gravity. The first data may include recordings from additional particle motion sensors. The particle motion sensor and the additional particle motion sensor form a single reception point group, and the single reception point group also includes the gravity motion sensor. The sensors of one reception point group are distributed along the streamer, over about a distance of 12.5 m. The particle motion sensor and the additional particle motion sensors of a single reception point group are centered around the gravity sensing sensor. The method may also include a step of generating an image of a subsurface of the earth based on the corrected seismic data.

Figure 9:
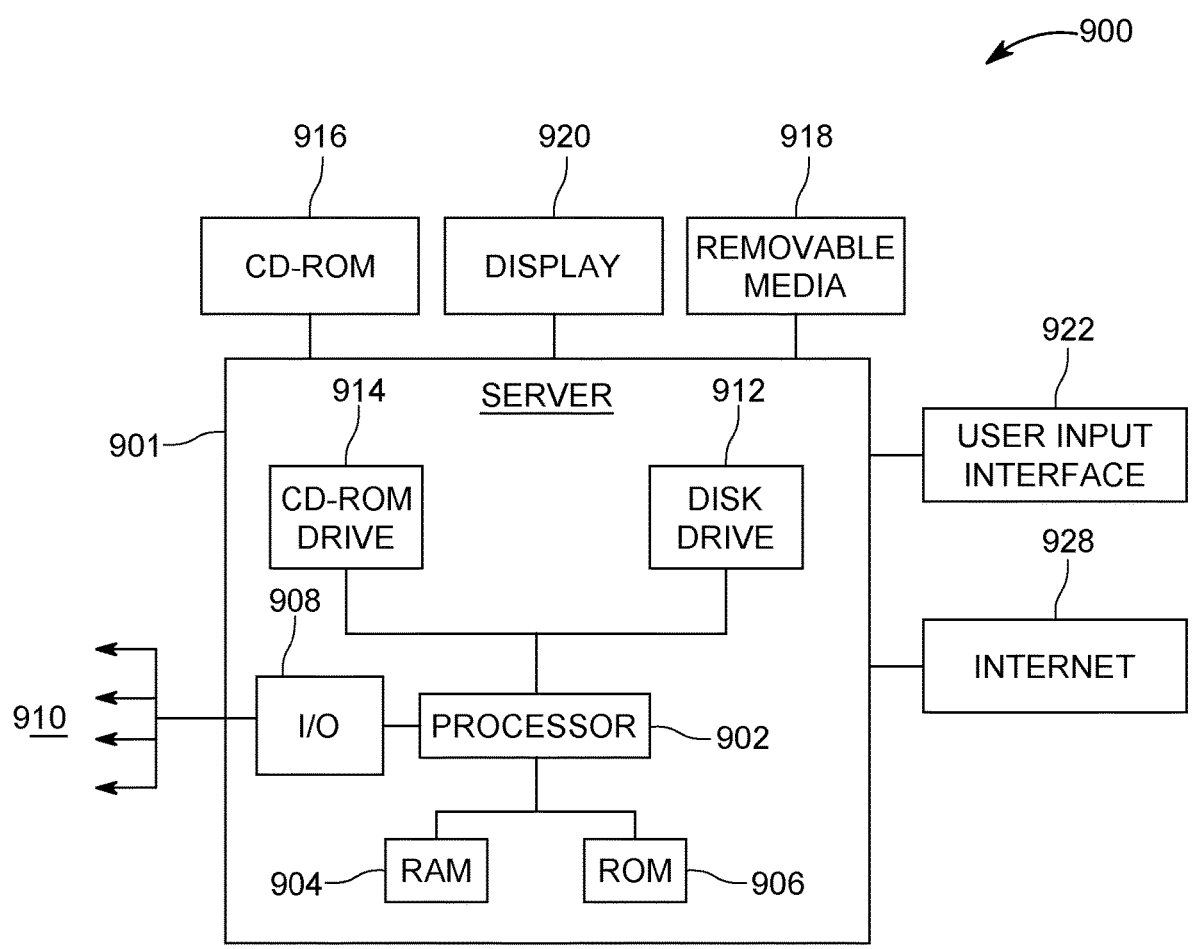
FIG. 9 is a schematic of a controller that can run one or more methods discussed herein.

The above-discussed procedures and methods may be implemented in a computing device as illustrated in FIG. 9. Hardware, firmware, software or a combination thereof may be used to perform the various steps and operations described herein. Computing device 900 of FIG. 9 is an exemplary computing structure that may be used in connection with such a system.

Exemplary computing device 900 suitable for performing the activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various landline and/or mobile computing devices.

The disclosed embodiments provide a computing device and a method for calculating a misalignment angle between two types of sensors and rotating the data recorded by one of these sensors with the misalignment angle. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] U.S. Pat. No. 10,222,500.
[2] U.S. Pat. No. 10,620,332

What is claimed is:

1. A method for verticalizing recorded seismic data, the method comprising:
   recording first data with a particle motion sensor, wherein the particle motion sensor is located on a streamer, and the particle motion sensor is configured to be insensitive to a direct current;
   recording second data with a gravity motion sensor, wherein the gravity motion sensor is also located on the streamer, and the gravity motion sensor is configured to be sensitive to the direct current and temporally synchronous to the particle motion sensor;
   selecting a cost function that associates corresponding values of the first data and the second data;
   determining a misalignment angle from maximizing the cost function, wherein the misalignment angle describes a misalignment between corresponding axes of the particle motion sensor and the gravity motion sensor; and
   correcting seismic data recorded by the particle motion sensor based on the misalignment angle so that the corrected seismic data is verticalized with regard to gravity.

2. The method of claim 1, wherein both the first data and the second data are recorded in response to a coherent noise present in the streamer.

3. The method of claim 2, wherein the coherent noise corresponds to transverse vibrations exerted on the streamer by one or more positioning devices attached to the streamer.

4. The method of claim 1, further comprising:
   calculating an orientation of the gravity based on measurements of the gravity sensing sensor.

5. The method of claim 1, wherein the cost function is defined as a scalar product between a first vector built based on the first data and a second vector built based on the second data.

6. The method of claim 1, further comprising:
rotating the seismic data with the calculated misalignment angle so that the corrected seismic data is aligned with the gravity.

7. The method of claim 1, wherein the first data includes recordings from additional particle motion sensors.

8. The method of claim 7, wherein the particle motion sensor and the additional particle motion sensor form a single reception point group, and the single reception point group also includes the gravity motion sensor.

9. The method of claim 8, wherein the particle motion sensor and the additional particle motion sensors are centered around the gravity sensing sensor.

10. The method of claim 1, further comprising:
generating an image of a subsurface of the earth based on the corrected seismic data.

11. The method of claim 1, wherein the particle motion sensor includes six different particle motion sensors and an output from the six particle motion sensors is averaged and used as the output of the particle motion sensor, and wherein the streamer further includes a tilt measuring sensor and hydrophones.

12. A computing device configured to verticalize recorded seismic data, the computing device comprising:
an interface configured to,
receive first data, which is recorded with a particle motion sensor, wherein the particle motion sensor is located on a streamer, and the particle motion sensor is configured to be insensitive to a direct current, and
receive second data, which is recorded with a gravity motion sensor, wherein the gravity motion sensor is also located on the streamer, and the gravity motion sensor is configured to be sensitive to the direct current; and
a processor connected to the interface and configured to,
selects a cost function that associates corresponding values of the first data and the second data,
determine a misalignment angle from maximizing the cost function, wherein the misalignment angle describes a misalignment between corresponding axes of the particle motion sensor and the gravity motion sensor, and
correct seismic data recorded by the particle motion sensor based on the misalignment angle so that the corrected seismic data is verticalized with regard to gravity.

13. The computing device of claim 12, wherein both the first data and the second data are recorded in response to a coherent noise present in the streamer.

14. The computing device of claim 13, wherein the coherent noise corresponds to transverse vibrations exerted on the streamer by one or more positioning devices attached to the streamer.

15. The computing device of claim 12, wherein the processor is further configured to:
calculate an orientation of the gravity based on measurements of the gravity sensing sensor.

16. The computing device of claim 12, wherein the cost function is defined as a scalar product between a first vector built based on the first data and a second vector built based on the second data.

17. The computing device of claim 12, wherein the processor is further configured to:
rotate the seismic data with the calculated misalignment angle so that the corrected seismic data is aligned with the gravity.

18. The computing device of claim 12, wherein the first data includes recordings from additional particle motion sensors, and the particle motion sensor and the additional particle motion sensor form a single reception point group, and the single reception point group also includes the gravity motion sensor.

19. A non-transitory computer readable medium including computer executable instructions, wherein the instructions, when executed by a processor, implement a method for verticalizing seismic data for determining oil and gas reservoirs, the medium comprising instructions for:
recording first data with a particle motion sensor, wherein the particle motion sensor is located on a streamer, and the particle motion sensor is configured to be insensitive to a direct current;
recording second data with a gravity motion sensor, wherein the gravity motion sensor is also located on the streamer, and the gravity motion sensor is configured to be sensitive to the direct current;
selecting a cost function that associates corresponding values of the first data and the second data;
determining a misalignment angle from maximizing the cost function, wherein the misalignment angle describes a misalignment between corresponding axes of the particle motion sensor and the gravity motion sensor; and
correcting seismic data recorded by the particle motion sensor based on the misalignment angle so that the corrected seismic data is verticalized with regard to gravity.

20. The medium of claim 19, wherein both the first data and the second data are recorded in response to a coherent noise present in the streamer, and the coherent noise corresponds to transverse vibrations exerted on the streamer by one or more positioning devices attached to the streamer.

* * * * *